UNITED STATES PATENT OFFICE.

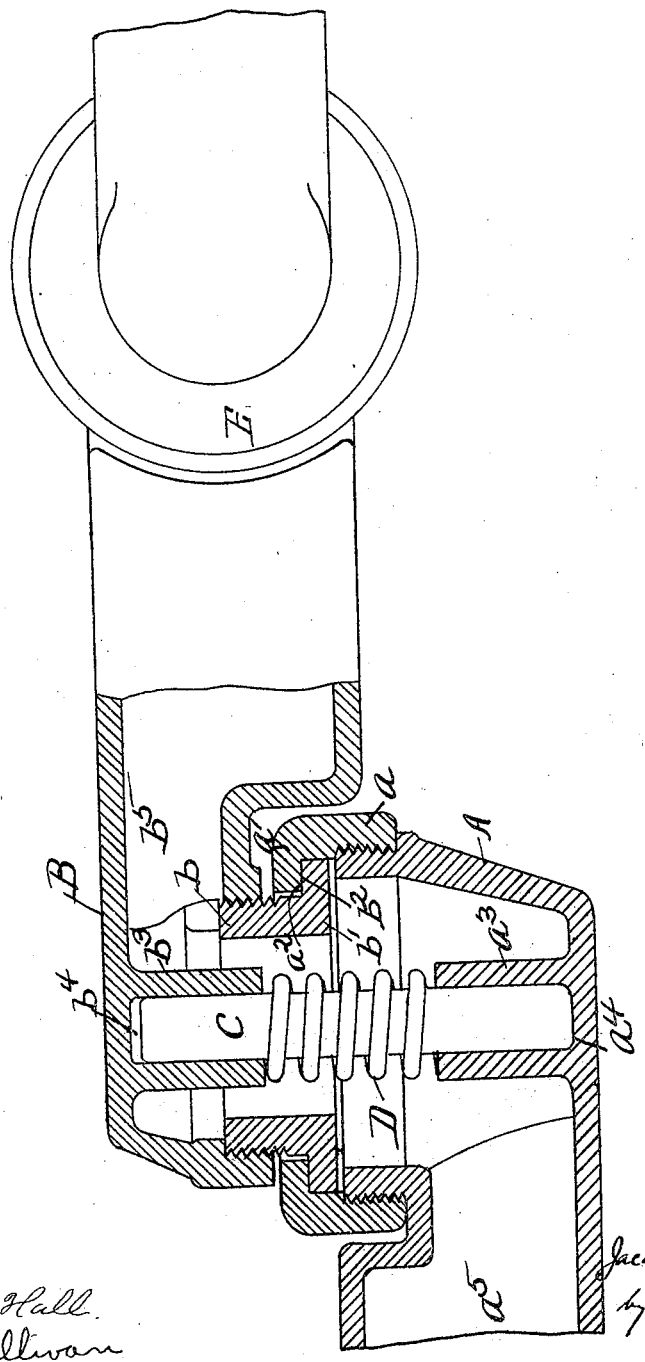

JACOB COPPERSMITH, OF COLLINWOOD, OHIO, ASSIGNOR OF ONE-HALF TO MARTIN STEINER, OF ERIE, PENNSYLVANIA.

FLEXIBLE PIPE-JOINT.

No. 804,304.     Specification of Letters Patent.     Patented Nov. 14, 1905.

Application filed March 21, 1904. Serial No. 199,156.

*To all whom it may concern:*

Be it known that I, JACOB COPPERSMITH, a citizen of the United States, residing at Collinwood, in the county of Cuyahoga and State of Ohio, have invented new and useful Improvements in Flexible Pipe-Joints, of which the following is a specification.

This invention relates to flexible pipe-joints; and it consists in certain improvements in the construction thereof, as will be hereinafter fully described, and pointed out in the claims.

The object of the invention is to make a flexible joint which under all conditions of pressure will remain tight and one that will automatically take up its wear.

In the accompanying drawing the members of the joint are marked, respectively, A and B. The member A has secured on it the flange-nut $a$, having the interiorly-extending flange $a'$. A joint-surface $a^2$ is arranged on this flange $a'$, said surface facing the body of the member A, with which it is formed. The member B has the flange-nut $b$, with the outwardly-extending flange $b'$, on which is a joint-surface $b^2$, arranged to be brought into contact with the joint-surface $a^2$. It will readily be seen that these joint-surfaces are interlocked, so as to secure the members A and B together. An outlet $b^5$ extends from the member B, and outlet $a^5$ extends from the member A. It will readily be seen that as this joint is subjected to fluid-pressure the surfaces $a^2$ and $b^2$ are forced into closer contact as the pressure increases, so that the joint will sustain practically any pressure to which it may be subjected within the limits of its strength.

It is desirable to keep the surfaces $a^2$ and $b^2$ in contact at all times in order to prevent dirt from lodging on said surfaces. This of course will create wear and to some extent impair the utility of the joint. To avoid this, I provide the member A with the lug $a^3$ and the member B with the lug $b^3$. These project up into the passage formed in the members. They are provided with the sockets $a^4$ and $b^4$, respectively. A pin C is arranged in these sockets, and a spring D arranged around the pin and tensioned against the lugs $a^3$ and $b^3$, so as to force the surfaces $a^2$ and $b^2$ into contact at all times.

The pin C preferably makes a sufficiently close fit with the sockets $b^4$ and $a^4$ to maintain the members A and B in axial alinement and concentric with each other.

While this joint has utility where used alone, its principal utility is in connection with the other joints, the axes of which are arranged at an angle. I show such a joint, E.

Where a series of these joints are connected together, they perform the same function as a rubber hose—as, for instance, the rubber hose used between cars—and as they automatically take up their wear they will last for a long period.

What I claim as new is—

1. A flexible pipe-joint, comprising the two members A and B, the member A having the flange-nut $a$, from which extends the flange $a'$, the flange being provided with a wearing-surface $a^2$ facing the body of the member A, and approximating a plane at right angles to the axis of the joint, the member B having the flange-nut $b$ from which extends the flange-shoulder $b'$, on which is the wearing-surface $b^2$, facing the body of the member B and contacting the surface $a^2$ to complete the joint, the contact-pressure on the surfaces $a^2$ and $b^2$, varying with the fluid-pressure in the joint; substantially as described.

2. A flexible pipe-joint, comprising the two members A and B, the member A having the flange-nut $a$, from which extends the flange $a'$, the flange being provided with a wearing-surface $a^2$ facing the body of the member A, and approximating a plane at right angles to the axis of the joint, the member B having the flange-nut $b$ from which extends the flange-shoulder $b'$, on which is the wearing-surface $b^2$, facing the body of the member B and contacting the surface $a^2$ to complete the joint, the contact-pressure on the surfaces $a^2$ and $b^2$, varying with the fluid-pressure in the joint, and a spring for maintaining said surfaces $a^2$ and $b^2$ in contact; substantially as described.

3. In a flexible pipe-joint the combination of the members A and B, the member A having the flange-nut $a$ with the surface $a^2$ thereon; the member B having the flange-nut $b$ with the joint-surface $b^2$ thereon, the surfaces $a^2$ and $b^2$ being opposed to each other, and interlocked to secure the members of the joint together, said members being provided with opposing lugs and sockets within the joint; a pin C in the sockets; and a spring D for forcing the members apart.

4. A flexible pipe-joint comprising two members having interlocked annular joint-surfaces arranged to be forced toward each other by pressure in the joint, the joint-surfaces of each member facing the body of the member on which it is formed, a separate guiding means at the axis of and wholly within the walls of the joint, for maintaining the members in axial alinement; substantially as described.

In testimony whereof I have hereunto set my hand in the presence of two subscribing witnesses.

JACOB COPPERSMITH.

Witnesses:
J. R. CRAIG,
M. C. SULLIVAN.